Figure 6:
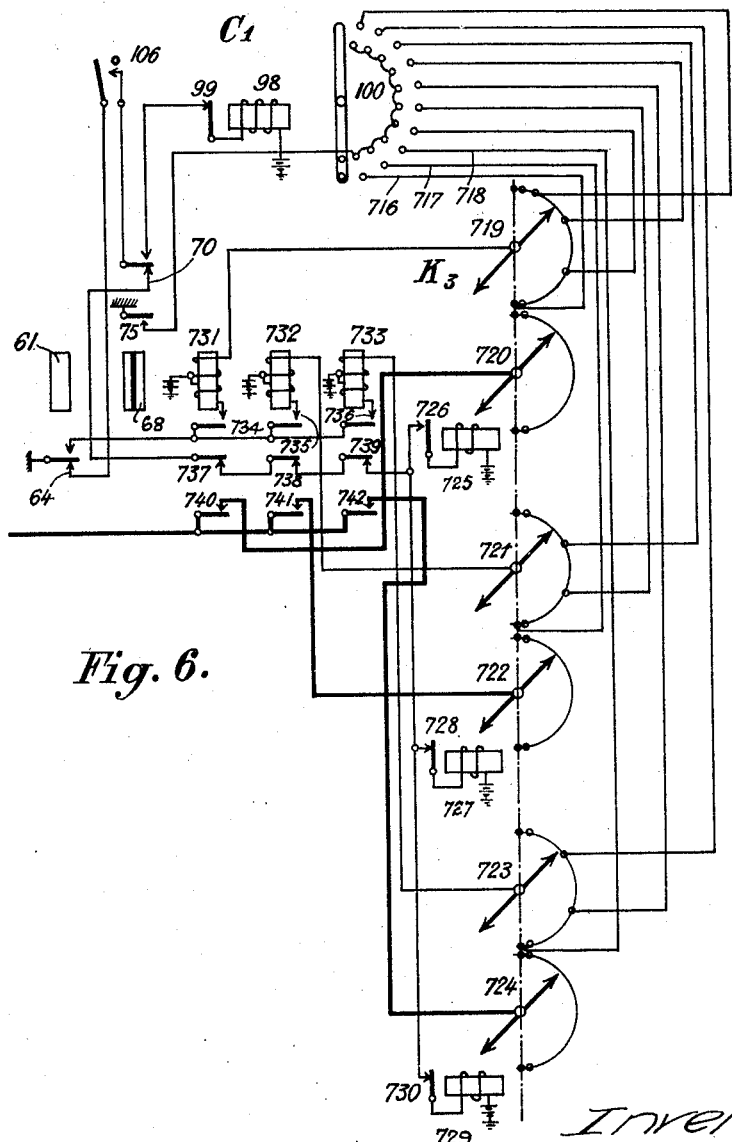
Figure 7:
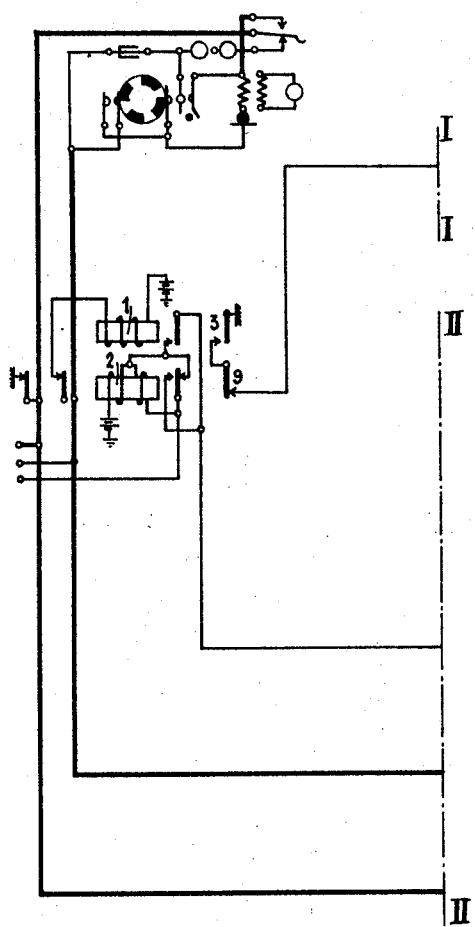
Figure 9:
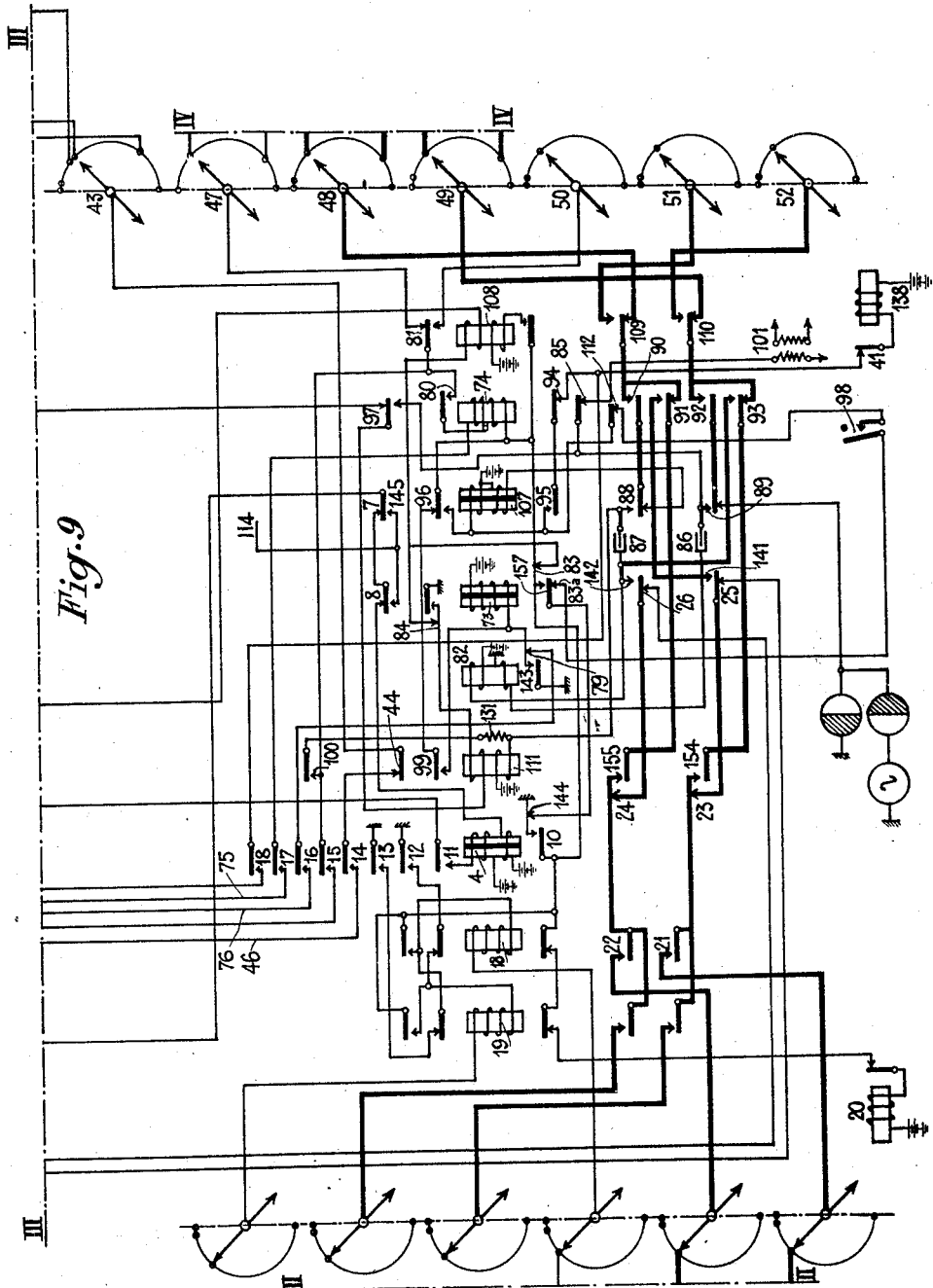
Figure 10:
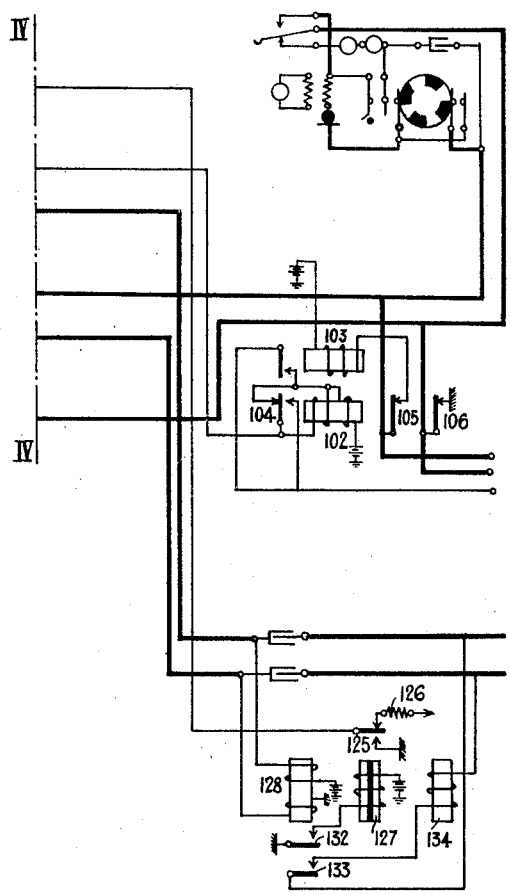

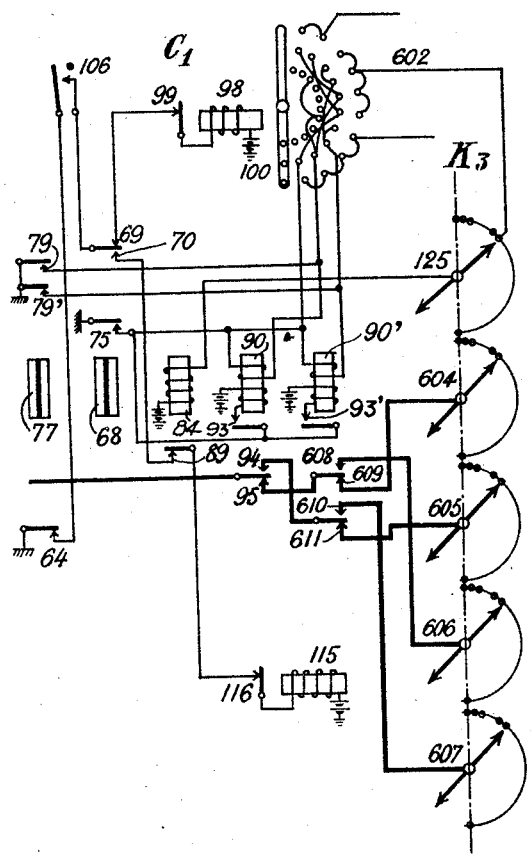

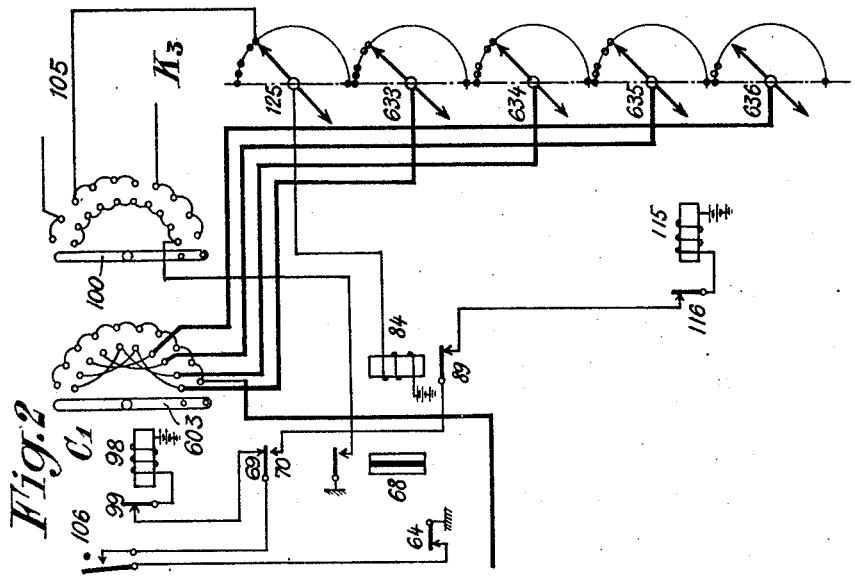
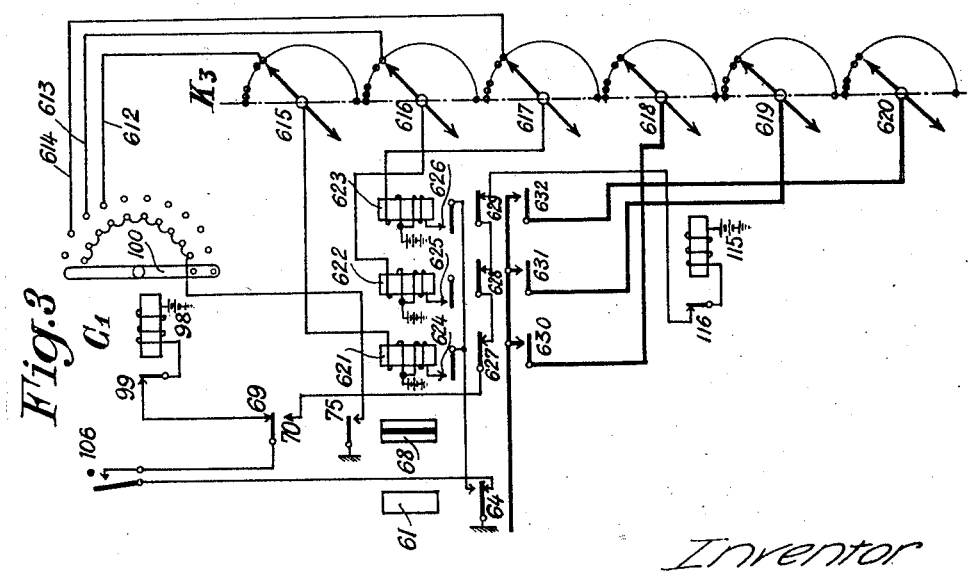

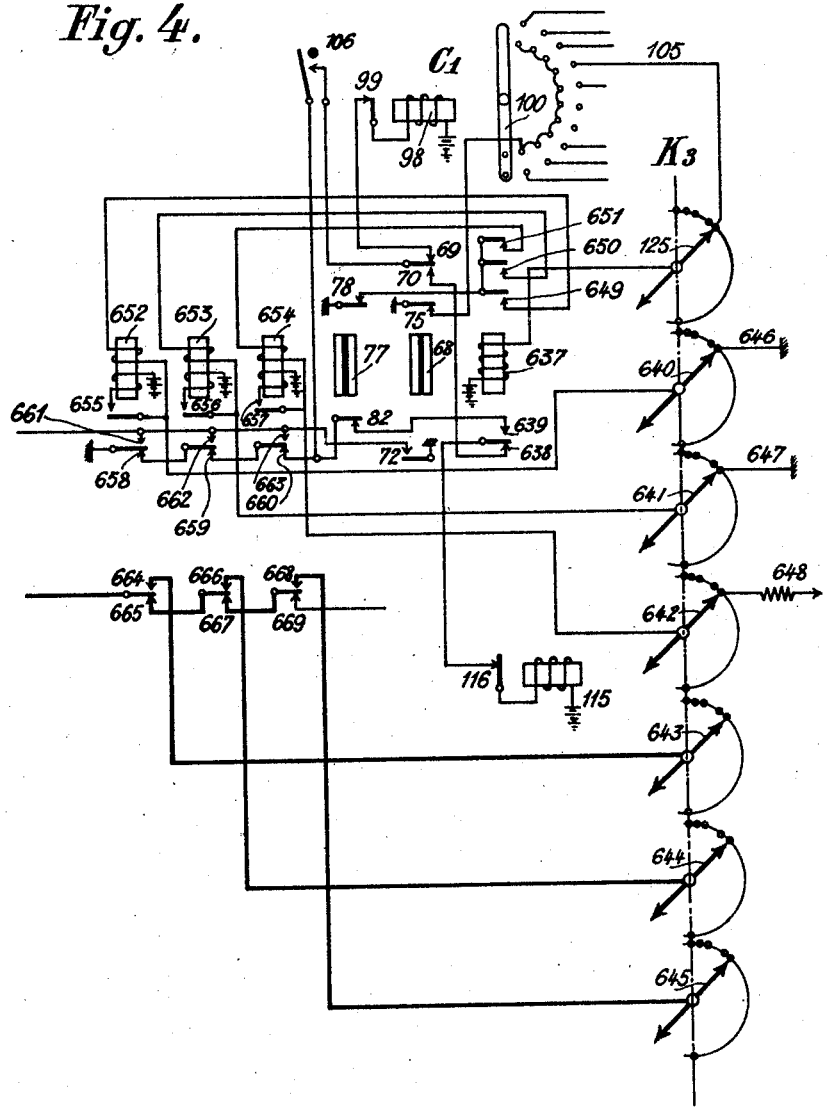

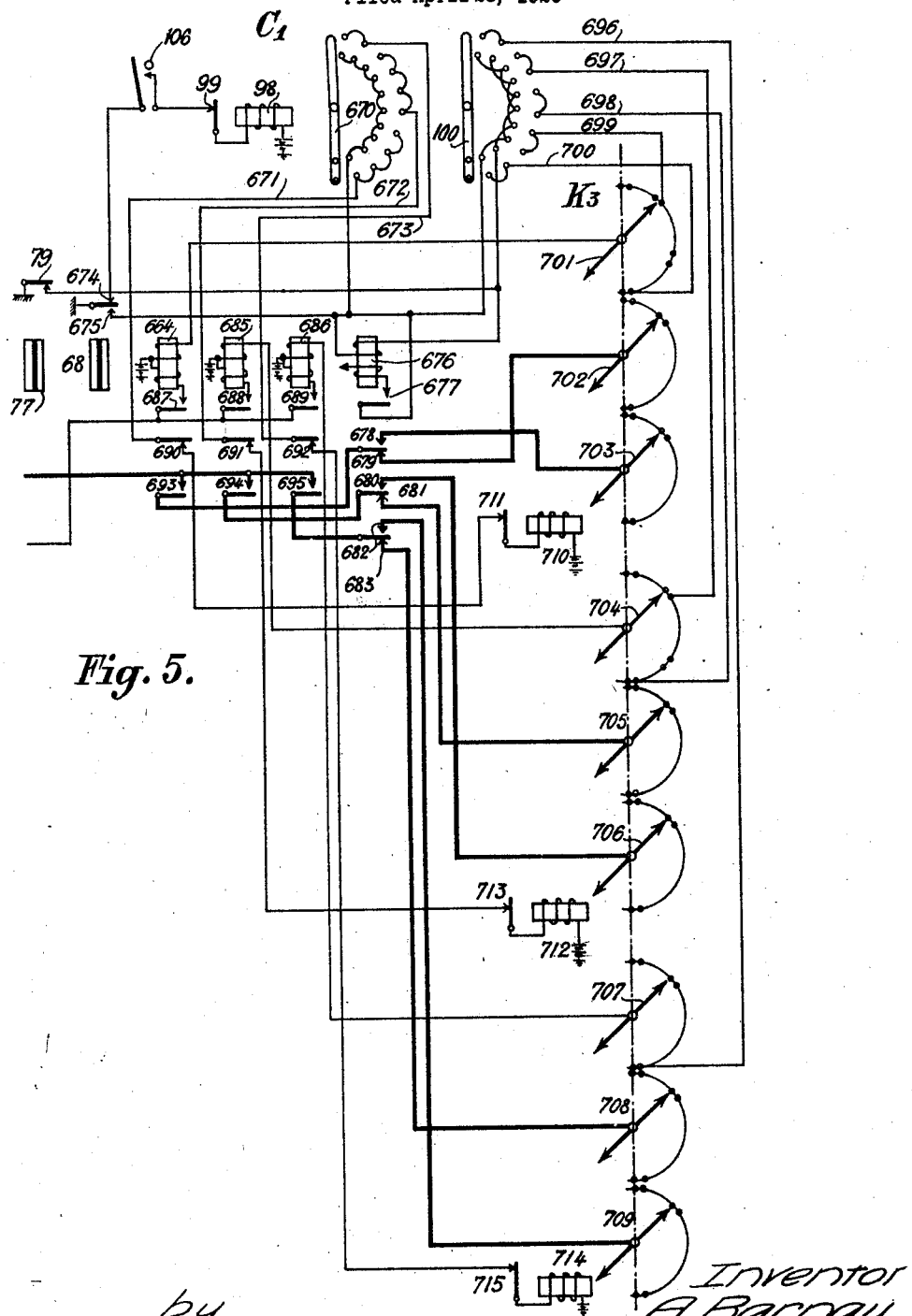

July 24, 1928.

A. BARNAY 1,678,318

AUTOMATIC SWITCHING SYSTEM

Filed April 28, 1925   9 Sheets-Sheet 7

Fig. 8.

Inventor
A. Barnay
by Langner, Parry, Card & Langner
Attys.

July 24, 1928.

A. BARNAY 1,678,318

AUTOMATIC SWITCHING SYSTEM

Filed April 28, 1925

9 Sheets-Sheet 9

Patented July 24, 1928.

1,678,318

UNITED STATES PATENT OFFICE.

ANTOINE BARNAY, OF PARIS, FRANCE.

AUTOMATIC SWITCHING SYSTEM.

Application filed April 28, 1925, Serial No. 26,507, and in France April 29, 1924.

In the automatic switching system described in my U. S. patent No. 1,556,474, the impulses are received in each selector (or groups of associated selectors) by a small switch having very little inertia, called the control switch, the condition of the control switch, at the end of the series of impulses determining the position of the principal or connecting switch. It is clear that the connecting switch must have found an idle line in the selected group of lines before the succeeding series of impulses is sent in, and for this reason, it is necessary to reduce as much as possible the time of operation of the connecting switch.

One of the most important characteristics of the system described in Patent No. 1,556,474, is the arrangement by which the time of rotation is decreased, thus permitting the use of a single motion connecting switch, having access to as large a number of lines as is economically practical.

This important arrangement is obtained by the use of several connecting means in the connecting switch, one or the other of the connecting means being automatically inserted in the talking circuit by a secondary switching system, the position of which is determined by the final conditions in the control switch. This latter, therefore, determines the angular position of the wipers of the connecting switch and, at the same time, which series of connecting means, or more exactly which of wipers are to be used for the connection.

The object of the present invention is to construct a system in which the connecting switch is of the one motion type comprising a number of simple switches of similar construction, each with its series of contacts and wipers, so that in the expansion of the system as the number of digits in the subscribers numbers increase, it becomes necessary merely to add to the series of rotary connecting switches, the similarity of the switches, and the singleness in their motion of operation rendering the extension of the secondary switching system by means of which they are controlled, a comparatively simple matter within the skill of the ordinary telephone electrician and making available for this purpose well known and standard relays and other apparatus.

Another of the objects of the invention is the provision of a control switch consisting of several elementary switches, each receiving a series of impulses, and all of the elementary switches being actuated by the same driving mechanism.

The annexed drawings represent, as an example only, one way of realizing the present invention.

Fig. 1 represents the general case of the combination adopted, in my patent No. 1,556,474, for choosing a series of wipers and represented in Figs. 2, 3 and 4 of the said application.

Figs. 2, 3, 4, 5, and 6 are diagrammatic representations of the system circuits utilizing different numbers of connecting mechanisms.

Figs. 7, 8, 9 and 10 are diagrammatic representations of different arrangements of a system particularly adapted to a line selector which in general requires two series of impulses, one for the tens and the other the units digits.

In a general way and in the arrangement as shown in Fig. 1, the main connecting switch "K" consists of "$n$" connecting mechanisms, one or the other of these mechanisms being inserted into the connecting circuit, according to whether the digit received by the control switch is a multiple of "$n$", of "$n+1$" of "$n+2$" etc. . .

The "$n$" connecting mechanisms are operated by the same driving mechanism and the choice of a determined connecting mechanism is made by the operation of appropriate relays, operated by the final position of the control switch.

In the example as shown in Fig. 1, the main connecting switch $K_3$, of a hundreds selector, for example, consists of four connecting mechanisms, each having a series of wipers 604, 605, 606 and 607 respectively and a control wiper 125. These wipers are driven step by step by the driving magnet 115 and the relays 90 and 90' control the connection of one of the four series of wipers into the connecting circuit.

When wiper 100 of the control switch C, reaches the position corresponding to the received digit, as it is explained for the hundreds selector, Fig. 2, in my patent No. 1,556,474 four different cases may exist:

(a) The received digit is a multiple of 4+1, for Example 5.

A stopping circuit for the magnet 115 is then closed by: battery, relay 84, wiper 125, first control contact of the called group (this group being represented by the same control contacts as for the called groups in the three following cases) control collector 602, control wiper 100, on its sixth contact, and ground at 75. Relay 84 energizes and opens at 89 the circuit of magnet 115. Neither relay 90 nor 90' is energized and the calling line is connected to wiper 604 by contacts 95 and 609. The selection of an idle line in the called group is made as described for the hundreds selector, in my patent No. 1,556,474.

(b) The received digit is a multiple of 4+2, for Example 6.

The circuit of stop relay 84 is closed as in the preceding case, but this time, the control wiper 100 is on the seventh contact of its bank and the stop circuit includes the upper winding of relay 90 which energizes and closes at contact 93 its holding circuit. The calling line is connected to wiper 605 by contacts 94 and 611.

(c) The received digit is a multiple of 4+3, 7 for example.

In this case, the stop circuit is closed by the control wiper on the eighth contact of its bank and the upper winding of relay 90' in series with relay 84. Relay 90' on energizing, connects the calling line by contacts 95 and 608 to wiper 606, and closes its holding circuit at 93'.

(d) The received digit is a multiple of 4; 8 for example.

Control wiper 100 comes to rest on the 9th contact and the circuit of relay 84 is closed in series with the upper windings of relays 90 and 90' in multiple. The energization of the two relays 90 and 90', simultaneously, connects the calling line to the wiper 607 by contacts 94 and 610. Relay 77 by its contacts 79 and 79' short-circuits relays 90 and 90', to prevent the operation of these relays while the wipers are rotating.

In the example as shown in Fig. 2, and in a general way, the main connecting switch K consists of "n" connecting mechanisms, driven by the same driving mechanism. The choice of one of the "n" connecting mechanisms being made directly by the control switch, which is equipped with contacts for connecting the calling line to any one of the "n" connecting mechanisms.

Fig. 2 represents a main connecting switch of a hundreds selector, for example, having four connecting mechanisms, each consisting of a series of wipers 633, 634, 635 and 636, mounted on the same shaft and driven by the rotary magnet 115.

The setting of the control switch C, according to the received digit, and the stopping of the wipers of the main connecting switch K, on the first line in the group of called lines takes place as it is described for the switch shown in Fig. 2 of my Patent No. 1,556,474.

According to whether the received digit is a multiple of 4+1, 4+2, 4+3, or is a multiple of 4, wiper 603 connects the calling line respectively to wipers 633, 634, 635, 636.

In the example shown by Fig. 3, the main connecting switch K consists of "n" connecting mechanisms, one of which is inserted into the connecting circuit, according to whether the received digit is a multiple of n, of n+1, etc...

These "n" connecting mechanisms are mounted on the same shaft and driven by the same driving mechanism and have, besides, connecting wipers and contacts, a control wiper and its associated contacts. The choice of one of the "n" connecting mechanisms is obtained by establishing a circuit comprising a control contact of the chosen mechanism and the contact in the bank of the control switch corresponding to the received digit.

In the application represented in Fig. 3, the main connecting switch K consists of three connecting mechanisms having each a series of connecting wipers and contacts, 618, 619 and 620, and a series of control wipers and contacts 615, 616, 617. These series of wipers are mounted on the same shaft and are driven by the rotary magnet 115.

The setting of the control switch C takes place as described in my Patent No. 1,556,474. According to whether the received digit is a multiple of 3+1, 3+2, or is a multiple of 3, the stop circuit is closed through control wiper 100 of control switch C and one of the relays 621, 622 or 623 in series with one of the wipers 615, 616 or 617 and one of the control conductors such as 612, 613, or 614.

The stop relays 621, 622 or 623 opens the circuit of rotary magnet 115 at contacts 627, 628 or 629 and connects the line to wipers 618, 619 or 620 respectively by the contacts 630, 631 or 632. When an idle line in the called group is selected, relay 61 energizes and closes the holding circuit of relay 621, 622 or 623 (already energized as explained above) by one of the contacts 624, 625 or 626, contact 64 and ground.

In Fig 4, the main connecting switch $k_s$ consists of "n" connecting mechanisms, each of which may have access to all or to a part of the outgoing line of the switch, the "n" connecting mechanisms testing simultaneously "n" lines of a group and the mechanism inserted into the connecting circuit being the one which is the first to find an idle line in the called group of lines.

The "n" connecting mechanisms may or may not be mounted on the same shaft and driven by the same driving mechanism; only one series of control contacts being necessary in case there is a common driving mechanism, the choice of the connecting mechanism being determined by the operation of the corresponding test relay which occurs as soon as the connecting mechanism, associated with the test relay, is driven on to an idle line, amongst the idle lines with which the "*n*" connecting mechanisms are in contact. If several of the connecting mechanisms are in contact with idle lines, only the first one will connect up the calling line.

The main connecting switch K, in the application represented, consists of three connecting mechanisms each one having a test wiper and associated contacts 640, 641 and 642 and line wiper and contacts 643, 644 and 645. They are mounted on the same shaft as the control wiper 125 and are driven by the rotary magnet 115.

The setting of the wiper 100 of the control switch C takes place as described in my Patent No. 1,556,474. When the wipers 125, 640 to 645 inclusive are brought into contact with the contacts of the first line in the called group, the following stop circuit is closed: battery, relay 637, wiper 125 and control contact conductor 105, wiper 100 and earth at 75. Relay 637 energizes in this circuit and opens at contact 638, the circuit of the magnet 115.

As soon as relay 77 falls back a free trunk hunting circuit is closed by earth 658, 659, 660, 82, 639, 116, 115 and battery.

Magnet 115 operates and advances step by step the wipers 125, 640, 641, 642, 643, 644 and 645. As long as the wipers are on the contacts of busy lines, the test wipers 640, 641, 642 do not find battery potential and the test relays 652, 653, 654, cannot energize one side of their upper winding being grounded at 649, 650, 651 and 75, and the other being connected to test wipers 640, 641 and 642. The rotary movement continues until one of the test wipers finds an idle line which is indicated by battery potential on the test contact such as the line connected to contact 648 associated with test wiper 642.

Relays 654 energizes in series with the resistance connected to conductor 648 and opens at 660 the circuit of magnet 115 and the wipers come to rest. Ground is kept on the test conductor to the preceding switches at 665 and at 668 the calling line is connected to wiper 645 at 669, the circuit of the line relay 65 (not represented see the Patent No. 1,556,474, Fig. 2) is opened and when relay 68 falls back, the holding circuit of relay 654 is closed by ground sent back over the test conductor by the following switch.

In a similar manner, relay 652 or 653 energizes if the first idle line is found by wiper 640 or 641.

If two or three idle lines are found simultaneously two or three test relays energize, for example the three relays 652, 653 and 654, but relay 652 opens at contact 665 the circuit of the line to wipers 644 and 645 and wiper 643 is the only one connected and ground being placed only on test wiper 640 by the following switch, via conductor 646 (corresponding to line wiper 643) relay 653 and 654 fall back, when relay 68 restores.

In Fig. 5, the main connecting switch $k_3$ consists of "*p n*" connecting mechanisms. These "*p n*" connecting mechanisms may be driven by "P" driving mechanisms. The operation of a given driving mechanism being determined when the control switch is set, by the impulses over the calling line, on contacts corresponding to groups of lines connected to the banks of one of the "*n*" connecting mechanisms driven by the determined driving mechanism, these organs therefore operate successively.

The "*n*" connecting mechanisms driven by the same driving mechanism may be combined in any one of the ways represented in Figures 1, 2, 3 or 4 or in a way which is a resultant of several of these figures in order to reduce the displacement in attaining a group of called lines and for exploring the lines in called group.

In Fig. 5, the main connecting switch $K_3$ consists of 6 connecting mechanisms ($n=2$ $P=3$) driven by three rotary magnets 710, 712 and 714. Each magnet drives two connecting mechanisms represented in Fig. 5 by the series of contacts 702, 703, 705, 706, 708, 709. Two connecting mechanisms such as 702, 703, 705—706, 708—709 are mounted on the same shaft with a control wiper 701, 704, 707.

Relay 676 connects the line circuit, either of 702 to 703, 705 to 706, 708 to 709, by its contacts 678—679, 680—681, 682—683. This relay operates like relays 90 and 90' in Fig. 1.

When the control switch leaves its normal position, its wiper 670, on passing over contacts 2, 3, 4 and 5, connects ground via contacts 675', 690 and 711 to magnet 710 which operates and advances the wipers 701, 702, 703. When wiper 670 reaches the sixth contact of its bank, i. e. has passed the four contacts corresponding to the groups of lines connected to the bank contacts of wipers 702 and 703, the circuit of magnet 712 is closed via contact 675, wiper 670, and contacts 691 and 713. Magnet 712 operates and advances the wipers 704 to 706 inclusive.

Finally, when wiper 670 has passed the contacts of its bank corresponding to the groups of lines connected to the banks of wipers 705 and 706, the circuit of magnet 714 is closed via ground, 675, 670, 692 and 715 and advances the wipers 707 to 709.

The circuits of the magnets 710, 712 and 714 are controlled respectively by the contacts 690, 691, 692 operated by relays 684, 685 and 686. These relays are connected respectively to the corresponding control wipers 701, 704 and 707.

When one of these relays energizes, as explained for the stop relays 622, in Fig. 3, its holding circuit is closed by contact 687, 688 or 689, and ground by a contact of relay 61.

The relay 684, 685 or 686, which energizes and definitely stops its wipers, is the one which is connected to the one of the control wipers 701, 704 or 707, which is connected by one of the conductors 696 to 700 inclusive to the bank contact of the control switch on which the wiper 100 is stopped.

Relays 684, 685 and 686 close respectively the calling line by 693, 679 and 678 on to the wipers 702, 703 by 694, 681 and 680, on to wipers 705, 706 and by 695, 683 and 682 on to wipers 708, 709.

In Fig. 6, the main connecting switch consists of "n P" connecting mechanisms operated by "p" driving mechanisms.

The "p" driving mechanisms are operated simultaneously and the connecting mechanism inserted into the connecting circuit is determined in the position of the control switch.

The "n" connecting mechanisms operated by the same driving mechanisms may be combined in any one of the ways represented in Figs. 1, 2, 3, or 4 or in a way which is a resultant of several of these figures.

In Fig. 6, the main connecting switch consists of three connecting mechanisms ($n=1$, $p=3$) operated respectively by the magnets 725, 727 and 729, the connecting mechanisms being represented by one line, wipers and contacts 720, 722, 724 and one control wiper and control contacts 719, 721 and 723.

The contacts of control switch C are connected by conductors such as 716, 717 and 718 partially to the control contacts 719, partially to control contacts 721 and partially to control contacts 723. Wiper 100 of the control switch is set by the impulses of the calling station as described in my Patent No. 1,556,474.

The operating circuits of magnets 725, 727, 729 are respectively closed as soon as the control switch leaves its normal position by 64, 106, 70, 737, 738, 739 and 726; —64, 106, 70, 737, 738, 739 and 728; —64, 106, 70, 737, 738, 739 and 730.

Magnets 725, 727 and 729, on operating advance simultaneously their wipers 719 to 724 inclusive. The circuits of these magnets may be opened by any one of the relays 731, 732, 733 at contacts 737, 738, 739.

The energization of one of these relays stops simultaneously the connecting mechanisms making up the main connecting switch.

The relays 731, 732 and 733 are connected respectively in the circuit of control wipers 719, 721 and 723, one of which is connected to ground by one of the control conductors, such as 716, 717, 718, connected to the bank contact of the control switch on which wiper 100 is stopped, i. e. on the contact corresponding to the digit sent in by the calling station.

The relays 731, 732 or 733, the circuit of which is closed, connects by 740, 741 or 742, the line to the connecting mechanism on the bank contact of which is connected the called line. These relays close at contacts 734, 735 or 736 a holding circuit to ground via a contact on relay 61.

It is quite evident that the arrangements of the main connecting switch described may be applied in its entirety to the selectors described in my Patent No. 1,556,474.

In the apparatus shown in Figs. 7, 8, 9 and 10, which are connected according to lines I—I, II—II, III—III and IV—IV, the control switch consists of $n$ associated elementary switches, each receiving a series of impulses and being actuated by a single rotary mechanism. As soon as the first series of impulses, received by the control switch, has directed the connecting switch to the first line in the group of lines corresponding to the first digit, the control switch is brought to normal position and may then receive a second series of impulses, then a third, etc. . .

The circuit represented in Figs. 7, 8, 9 and 10, is relative to an application of this arrangement, particularly appropriate to a line selector which generally requires two series of impulses, one for the ten digits, the other for the units digits.

A small capacity system, not requiring group selectors, has been taken as an example in order to make clear the very interesting features of the invention, and in which not only local connections are possible, but also connections with other offices either manual or automatic. The trunk lines to these offices may be reached by calling either a one or two digit number and the connecting switch choosing automatically an idle line in the group, the group of lines being determined by an appropriate wiring of the control contacts in the bank of the connecting switch.

Suppose that the station P would like to call the station P' the number of which is "31":

When the receiver is taken down at the calling station P, relay 1 energizes as described in the Patent No. 1,556,474 (Fig. 2 relay 1). Relay 4 energizes in the circuit: battery, lower winding of 4, contacts 8, 7, 6, 5, 9, 3 and earth. At 12 and 13, earth is connected to relays 18' and 19, and at 10 to rotary magnet 20. The finder operates as described in the Patent No. 1,556,474, and when relay 18 energizes, the calling line is connected to relay 27 in the control switch at 21—22, 23—24, 25—26.

Relay 27, which has one of its windings connected to battery and the other to an earth on which is superposed the dialling tone, energizes in series with the calling line and station, and closes at 28 the circuit of 29, which on energizing closes the holding circuit of 4 by 30, common conductor 31, 11 and the upper winding of 4. This relay being slow to release does not fall back during the interval of time that elapses between the opening of 9 and the closure of 30. At 5ª, the starting conductor is connected to a group of finders and line selectors associated with another control switch.

When the calling subscriber operates his calling device for the first digit of the wanted number, the digit "3" in this case, relay 27 sends three impulses to the magnet 33 which rotates its wipers 34 and 35 into engagement with the 4th series of bank contacts. After the first stop of the magnet 33, contacts 36 and 37 are closed, and the circuit of the selector magnet 138 is closed by: earth, 36, 38, 39, common conductor 40, 18, 41, magnet 138, battery. At the same time the circuit of the stop relay 42 is closed by: earth, 2nd contact of the inside level of the bank of the control switch, wiper 34, control conductor No. 1 of the tens digits, wiper 43, contacts 44, 4, common conductor 46, contact 45, relay 42 and battery. Relay 42 energizes before the magnet 138 has the time to operate and opens at 38 the circuit of 138. Relay 42 remains energized until wiper 34 leaves the third bank contact, at which time it falls back and closes the circuit of 138, which operates and advances the wipers 43 to 52 inclusive. At the end of the tenth step of 138, wiper 43 is in engagement with a contact earthed by wiper 34 and 42 energizes again and opens the circuit of 138.

During the series of impulses, relay 53 energizes in series with magnet 35, and being slow to release, remains in operated position. An instant after the impulses cease, 53 falls back and when 42 is energized the second time with 53 in normal position, a new circuit for 53 is closed by: earth, contacts 30, 54, 139, 59, relay 60, contacts 37, 61 magnet 33, battery. Magnet 33 drives its wipers to normal position. In this position, 36 and 37 operate and open the circuit of 33, and the wipers come to rest. During the operation of 33, slow to release relay 60 energizes and closes at 62 the circuit: earth, 36, 62, relay 42, battery. When 36 is opened, 42 falls back followed an instant after by 60. During this instant the circuit of relay 64 is closed by: earth, 30, 54, 58, 63, relay 64, battery. Relay 64 closes its holding circuit at 65, and at 66 connects earth to the interior row of contacts wiped over by wiper 35.

When the calling subscriber operates his calling device for the second digit of the wanted number, the digit "1" in this case, magnet 33 receives one impulse and advances its wipers one step. The circuits of magnet 138 and relay 42 are again closed as described above and the magnet 138 does not operate, since the control wiper 43 is in engagement with the contact earthed by wiper 35 (see patent application 653,568).

When relay 53 falls back, the circuit of 68 is closed by earth contacts 30, 54, 139, 140, relay 600, contact 71, resistance 72, battery. The relays 75 and 74 are connected in series by the circuit: earth, contact 10, relay 74, contact 17, common conductor 75, contacts 78, 69, common conductor 76, contacts 16, 79, relay 73, battery. At the same time at 70, test wiper 47 is connected to a point between relays 73 and 74 in the above circuit, over the circuit: common conductor 77, contacts 15, 81, test wiper 47.

If the called line is engaged, there is earth in series with a low resistance, such as relays 18 and 19, or the lower winding of relay 74 on the test contact and relay 74 being shunted by this earth does not energize, but relay 73 energizes, at 25 and 26 disconnects the calling line from relay 27, and connects it at 141 and 142 to relay 82. Relay 82 on energizing in series with the station P, opens at 79 the energizing circuit of 73 and at the same time closes at 143 a holding circuit for this relay.

When the circuit of 27 is opened, this relay on falling back opens the circuit of 29, which on restoring causes the release of the control switch as will be described further on, and opens at 30 the holding circuit of relay 4 which, on restoring, disconnects the line selector from the control switch which may now be used for another connection.

In the line selector relays 82 and 73 are energized and the engaged tone is sent over the circuit: battery, left winding of the transformer 101, 85, condenser 86, 141, calling line and station P, 142, upper winding of 82 and battery.

When the calling subscriber hangs up his receiver, the connection is released as will be described further on.

If the called line is idle, the test wiper finds battery on the test contact in series with the right winding of low resistance of relay 102; 74 energizes and short-circuits at 80 its upper winding of high resistance; under the action of its lower resistance winding 74 operates all of its contacts, 102 energizes with the low resistance winding of 74 and at 104 removes the short-circuit from its high resistance winding in order to busy the line to other calls, 74 remains energized in series with the two windings of relay 102.

On the other hand, earth in series with 74 energizes 73 which being slow acting, operates its contacts after the energization of relay 74. The energization of relay 73 causes the energization of 82 and the disconnection of the control switch, as it was described in the case of an engaged line.

In the line selector, relays 82, 73 and 74 are energized and the called line is connected to the ringing generator by 90 and 92, the operation of the ring cut off relay 107 and battery feed relay 111 takes place as described in the Patent No. 1,556,474.

At the end of the conversation, when the calling party hangs up his receiver, 82 falls back and opens the circuit of 73 which, on falling back, removes earth from 107, 74 and 18, which falls back. At 83 another circuit for 107 is closed by earth, 111, 83ª, 98, 112, upper winding of 107 and battery. Relay 107 closes the circuit of magnet 138 in parallel with its upper winding by the contacts 95, 94 and 41. Magnet 138 drives the wipers to normal position. At normal position, the circuit of 138 is opened at 98, 107 remains in operated position during the operation of magnet 138, and switches the start conductor to the next line selector. In normal position 98 is opened and 107 falls back. The selector is now free to receive another call.

In the control switch, when 29 falls back, earth is removed from 30 and relays 64 and 68 fall back. At 146, the circuit of magnet 33 is closed by: earth, 147, 53, 146, 37, 61, magnet 33 and battery. Magnet 33 operates and drives the wipers to normal position. In normal position, the circuit of 33 is opened at 37. Relay 53 energizes in series with magnet 33 and by 148 and 113 the starting conductor is switched to another group of finders and line selectors associated with another control switch. An instant after the contact 37 is opened, relay 53 falls back and the control switch may be used for extending another call.

Suppose now that the call is for another office, the call number of which is "57" and that there are three trunk lines leading to the office.

When the calling subscriber takes down his receiver his line is connected by a finder switch to a line selector as described in the preceeding case, and the control switch operates in the same manner.

After the first digit "5" is called, wipers 34 and 35 are engaged with the 6th series of bank contacts, and when relay 53 falls back, the circuit of 115 is closed by: earth, 149, 6th contacts short-circuited by wiper 34, contacts 57, 118, relay 115 and battery. Relay 115 closes at 150 its holding circuit to earth by 30.

When the wiper 43 of the line selector is brought to rest on the control contact earthed by wiper 34, the control switch drives its wipers to normal position and connects earth to wipers 35 as hereinbefore described.

When the second digit "7" is called, the control switch drives its wipers 34 and 35 into engagement with the 8th series of bank contacts and when 53 falls back and 42 energizes, the circuit of 116 is closed by earth, 66, the 8th series of contacts short-circuited by wiper 35, contacts 117, 56, 123, relay 116 and battery.

Relay 116 closes its holding circuit at 124 to earth by contact 30, places earth at 158 on the 8th unit control conductor, disconnects battery from relay 68 at 71, connects at 151 relay 68 to control wiper 43 of the line selector by 46, 14, and 44, disconnects at 39 magnet 138 from the contacts of 42, and connects it at 152 to the control wiper 43 of the selector; opens at 45 the energizing circuit of 42, after having established a holding circuit for this relay at 119 and finally at 120 connects the upper winding of relay 111 to the test wiper 47 of the line selector.

If the first line of the group of three lines is idle, there is battery in series with a low resistance on the test contact and 111 energizes by: earth, contacts 10, 83, 84, upper winding of 111, 97, 129, 120, 153, 77, 15, 81, test wiper 47, contact 125, resistance 126 and battery. Relay 111 opens at 44 the circuit of magnet 138, before the magnet operates, closes at 100 the circuit of its lower winding to the test wiper in series with the resistance 131; closes at 99 the circuit of 73 and connects at 154 and 155 the calling line to the wipers 48 and 49, by 91, 93, 109 and 110.

Relay 128 energizes in series with the calling line and station, and closes at 132 the circuit of 127. Relay 127 replaces at 125 the battery on the test conductor by earth, which holds relay 111 of the line selector in operated position by the circuit: earth, 125, test wiper 47, contacts 81, 100, resistance 131, lower winding of 119 and battery. At contact 99, relay 111 establishes another circuit for relay 75 by: earth, contacts 144 (when relay 4 falls back) 157, 96, 99, relay 73 and battery.

Relay 128 closes a bridge across the outgoing trunk line at 133, in series with the impedance coil 134, in order to give a calling signal in the distant office.

At the end of the conversation, when the calling party hangs up his receiver, 128 falls back, followed by 127, which removes at 125 earth from the test conductor. Relay 111 in the selector restores and opens at 99 the circuit of 73. When 73 falls back, the selector releases as described in the preceding case.

If the first line is engaged, there is no battery on the test conductor; relay 111 cannot energize and magnet 138 operates in the circuit: battery, 132, 41, 18, common conductor 40—152, common conductor 46 and earth, 14, 44, wiper 43, 8th control conductor 158. Magnet 138 drives the wipers on to the contacts of the nest line, and if it is idle, relay 111 energizes and opens the circuit of 138 at 44. If this line is also engaged, relay 111 cannot energize and the magnet continues to operate and drives the wipers on to the contacts of the 3rd line. If the third and last line of the group is engaged, relay 111 will not be energized, and as the 9th unit control conductor is not earthed, relay 68 energizes in series with magnet 138 over the circuit earth-contacts 30, 34, 130, 140, relay 68, contacts 151, 152, common conductor 40, contacts 18, 41 magnet 138 and battery. On account of the high resistance of 68, 138, does not operate. Relay 68 closes at 60 and 70 the circuit of 75 by: earth on the test conductor of the 3rd line, test wiper 47, contacts 81, 15, common conductor 77, contacts 70 and 60, common conductor 76, contacts 16 and 79, relay 73 and battery.

The energization of only relay 73 in the line selector effects the release of the control switch, and causes the engaged tone to be sent to the calling subscriber as it was described in the case of a local connection. When the calling subscriber hangs up his receiver, the release of the collector takes place as it has already been described.

Since the control switch is common to a certain number of line selectors, it is quite important that it should not be occupied by false calls. With this in view, relay 137 and the two interruptors 135 and 136 are provided. When the control switch is taken into use, when relay 29 energizes, a circuit for 137 is prepared by: earth, 30, 34, relay 137 122, common conductor and interruptor 135. The interruptor 135 closes its contacts every 10 seconds latter the control switch has not received any impulses (that which causes the energization of relay 53 and the de-energization of 137), when the interrupter closes its contact again, the circuit of relay 75 in the selector is closed by: earth-interrupter 136, contacts 121, 76, 16, 79, relay 73, and battery. Relay 73 effects the release of the control switch and causes the engaged tone to be sent out on the calling line.

What I claim as my invention and desire to secure by Letters Patent is:

1. In an automatic telephone system, a calling line, a called line, an electrical impulse sender, an impulse receiving organ having two separate series of contacts, a single motion connecting mechanism for connecting calling and called lines, the said mechanism having a plurality of series of contacts and corresponding sets of wipers constituting a plurality of similar rotary switches commonly driven, means for determining the setting of the said wipers by the state of the first series of contacts of the impulse receiving organ, the calling line being connected to a given set of wipers by the second series of contacts of the impulse receiving organ.

2. In an automatic telephone system such as claimed in claim 1, an impulse receiving organ consisting of a rotary switch having several rows of contacts and an equal number of wipers, the calling line being connected to one of the sets of wipers of the connecting mechanism by one of the series of contacts and its associated wiper, of the rotary switch.

3. In an automatic telephone system, a calling line, a called line, an electrical impulse sender, an impulse receiving organ having contacts, a single motion connecting mechanism for connecting calling and called lines, the said mechanism having a certain number of series of connecting and control contacts, connecting and control wipers moving together constituting a plurality of similar rotary switches commonly driven, each control contact being connected to a determined contact of the impulse receiving organ, a control circuit for the connecting mechanism; contacts in the said circuit operated by stop relays, each of the said stop relays being connected to an associated control wiper; contacts for connecting the calling line to the connecting wipers, the said contacts being operated by the stop relays.

4. In an automatic telephone system, such as claimed in claim 3, a holding circuit for each stop relay and means for rendering this circuit inoperative until the wipers of the connecting mechanism are definitively set.

5. In an automatic telephone system such as claimed in claim 3, a holding circuit for each stop relay, a contact in series with the said circuit, a test relay for operating the said contact, means for operating the said test relay when the wipers of the connecting mechanism are definitively set.

6. In an automatic telephone system, a calling line, groups of called lines, an electrical impulse sender, an impulse receiving organ, a single motion connecting mechanism constituted by a plurality of like-type switches commonly driven for connecting the calling line to a line in the called group, the said mechanism having a certain number of series of connecting and test contacts and sets of corresponding connecting and test wipers, means by which a first setting of the wipers of the connecting mechanism is determined by the state of the impulse receiving organ, the lines in each called group being connected to successive and corresponding connecting and test contacts of the series of contacts, a free hunting circuit for the connecting mechanism, a plurality of contacts in series in the said circuit, test relays for operating the said contacts, each of the said relays corresponding to a series of contacts, means for energizing one of the said test relays when its corresponding set of wipers are in contact with an idle line and means for connecting the calling line to the found idle line by the energization of the said test relay.

7. In an automatic telephone system such as claimed in claim 6, means for neutralizing the effects of the energization of a test relay when a preceding test relay is energized.

8. In an automatic telephone system such as claimed in claim 6, contacts in series with the calling line, each contact operated by a test relay for connecting the calling line to a set of wipers corresponding to an idle line in the called group.

9. In an automatic telephone system such as claimed in claim 6, switching arrangements having working and resting contacts, these latter contacts being arranged in series with the succeeding switching arrangement, the working contacts being each connected respectively to a set of wipers, each switching arrangement being operated by a test relay.

10. In an automatic telephone system, a calling line, a called line, an electrical impulse sender, an impulse receiving organ, a single motion connecting mechanism for connecting calling and called lines, the said mechanism having several groups of contacts and associated wipers and a certain number of driving mechanisms, each operating certain sets of wipers, means for determining the setting of certain sets of wipers by the state of the impulse receiving organ and means for inserting certain sets of wipers in the connecting circuit according to the state of the impulse receiving organ.

11. In an automatic telephone system such as claimed in claim 10, means for operating successively the driving mechanisms.

12. In an automatic telephone system such as claimed in claim 10, an impulse receiving organ having a supplementary series of contacts, a controlling circuit for each of the driving mechanisms including certain of the said supplementary contacts in order that a certain determined controlling circuit may be closed by certain positions of the impulse receiving organ.

13. In an automatic telephone system such as claimed in claim 10, an impulse receiving organ consisting of a rotary control switch having two series of contacts and two sets of wipers; in the connecting mechanism a series of control contacts for each of the driving mechanisms connected to certain contacts in one of the said series of contacts of the control switch, the controlling circuit of the said driving mechanisms including contacts of the second series of contacts of the control switch.

14. In an automatic telephone system such as claimed in claim 10, several series of contacts and associated wipers in a group corresponding to a driving mechanism, means for inserting in the connecting circuit a determined series of contacts and its associated wiper according to the state of the impulse receiving organ.

15. In an automatic telephone system such as claimed in claim 10, a controlling circuit for each of the driving mechanisms, an interrupter in series with each of these circuits, a stop relay for operating each of these interrupters when the wipers are set on the called line, contacts placed on the calling line and operated by a corresponding stop relay for connecting the said line to a group of wipers of the connecting mechanism.

16. In an automatic telephone system such as claimed in claim 10, several series of contacts and associated wipers in a group corresponding to a driving mechanism; certain groups having the same number of series of contacts and wipers; switching contacts arranged in the circuit of the calling line for connecting the said line to one or the other of a series of a group and means for operating simultaneously the said contacts.

17. In an automatic telephone system such as claimed in claim 10, means for operating simultaneously the different driving mechanisms.

18. In an automatic telephone system such as claimed in claim 10, only one controlling circuit for the driving mechanisms, a number of interrupters equal to the number of driving mechanisms in series with the said circuit, a stop relay for each of the said interrupters and means for energizing a determined stop relay according to the state of the impulse receiving organ.

19. In an automatic telephone system, a calling line, a called line, an electrical impulse sender, an impulse receiving organ having several series of contacts, each series corresponding to a series of impulses and operating means common to the several series of contacts, a single motion connecting mechanism for connecting calling and called lines, comprising a shaft having a plurality of switches of like-type fixed thereupon each including contacts and wipers, and means for setting the wipers by successive degrees according to the successive positions of the impulse receiving organ.

20. In an automatic telephone system such as claimed in claim 19, a connecting mechanism having connecting contacts and wipers and a control wiper and contacts, certain of the control contacts being connected to certain of the series of contacts of the impulse receiving organ, an operating circuit for the connecting mechanism, an interrupter in series with the said circuit and operated by a stop relay connected to the control wiper, means for switching the circuit of the stop relay successively on to the several series of contacts of the impulse receiving organ, between each series of impulses.

21. In an automatic telephone system such as claimed in claim 19, an impulse receiving organ consisting of a rotary switch having several associated switching elements, each relative to a different series of impulses and operated by the same driving mechanism.

22. In an automatic telephone system such as claimed in claim 19, an impulse receiving organ consisting of a rotary switch having several rigidly associated switching elements, each relative to a different series of impulses and operated by the same driving mechanism and means for restoring the rotary switch to normal position after the setting of the wipers of the connecting mechanism at the end of a series of impulses.

23. In an automatic telephone system such as claimed in claim 19, an impulse receiving organ consisting of a rotary switch having several rigidly associated switching elements, each relative to a different series of impulses and operated by the same driving mechanism, a restoring circuit for the rotary switch including three interrupters in series, means for closing the first interrupter when the switch leaves its normal position, means for closing the second interrupter between each series of impulses, and means for closing the third interrupter when the wipers of the connecting mechanism are set in conformity with the series of impulses precedingly received.

24. In an automatic telephone system, a calling line, a called line, an electrical impulse sender, an impulse receiving organ consisting of a rotary control switch having several rigidly associated switching elements, each relative to a different series of impulses and operated by the same driving mechanism, a single motion connecting mechanism for connecting calling and called lines, having contacts and wipers, an operating circuit for the connecting mechanism, means for setting the wipers by successive degrees according to the successive positions of the impulse receiving organ, a stop relay controlling the said circuit, means for restoring the rotary control switch to normal position after the setting of the wipers of the connecting mechanism, corresponding to each received series of impulses, means for switching the circuit of stop relay successively on to the several switching elements, after the control switch is restored to normal position.

25. In an automatic telephone system such as claimed in claim 24, a switching device for the stop relay, two interrupters in the control circuit of the said switching device, means for closing one of the said interrupters when the control switch is in normal position and a slow acting relay included in the restoring circuit of the control switch, operating the other.

26. In an automatic telephone system such as claimed in claim 19, a test circuit for the called line, an interrupter included in the said circuit, means for closing the said interrupter at the end of the last series of impulses received by the impulse receiving organ when the wipers of the connecting mechanism are set on the contacts of the called line.

27. In an automatic telephone system as claimed in claim 24, a test circuit for the called line, an interrupter included in the said circuit, a relay operating the said interrupter, three interrupters included in the circuit of the said relay, means for closing the first of the said interrupters at the end of the last series of impulses, means for closing the second of the said interrupters when the wipers of the connecting mechanism are set in conformity with the last series of impulses and means for closing the third of the said interrupters when the circuit of the stop relay is switched on to the last switching element.

28. In an automatic telephone system such as claimed in claim 19, a release circuit for the impulse receiving organ, a timing device controlling the said circuit, means for causing the release of the impulse receiving organ at the end of a given time, if during this time no impulses are received.

29. In an automatic telephone system such as claimed in claim 19, two periodical synchronous interrupters closing their contacts one after the other, a release relay for the impulse receiving organ, the lagging interrupter arranged for closing the circuit of the said relay when the impulse receiving organ is taken into use, means for guarding the said relay energized until a series of impulses are received, another interrupter in series with the leading periodical interrupters and operated by the energization of the said release relay, in order to produce the release of the impulse receiving organ by the closure of the contact of the leading periodical interrupter.

30. In an automatic telephone system, such as claimed in claim 19, two periodical synchronous interrupters closing their contacts one after the other, a release relay for the impulse receiving organ, the lagging interrupter arranged for closing the circuit of the said relay when the impulse receiving organ is taken into use, a holding circuit for the said release relay, an interrupter included in the said circuit and arranged to be operated by a slow acting relay inserted in series with the impulse circuit, an interrupter in series with the leading periodical interrupter and operated by the energization of the said release relay, in order to produce the release of the impulse receiving organ by the closure of the contact of the leading periodical interrupter.

31. In an automatic telephone system as claimed in claim 19, a relay arranged so as to be energized if the called line is free, a slow acting relay arranged so as to be energized after the definite setting of the wipers of the connecting mechanism, means for disconnecting the calling line from the impulse receiving organ by the energization of the said slow acting relay and means for giving the busy signal to the calling line when the said slow acting relay is energized alone.

32. In an automatic telephone system, a calling line, a group of called lines, an impulse sender, an impulse receiving organ, a single motion connecting mechanism for connecting the calling line to a line in the called group and having contacts and wipers, means for setting the wipers on the first line of the called group by successive degrees according to the successive positions of the impulse receiving organ, contacts arranged so as to be operated by a call number corresponding to the called group and means by which an idle line in the called group is caused to be selected by the operation of the said contacts.

33. In an automatic telephone system such as claimed in claim 32, selecting relays arranged to be energized by a given call number and equal in number to the digits composing the call number determining their energization.

34. In an automatic telephone system such as claimed in claim 32, selecting relays, an impulse receiving organ having several series of contacts, each relative to a different series of impulses, certain contacts of a series being connected to certain selecting relays corresponding to the said series, an interrupter included in the circuit of each of the said relays and operated by the selecting relay corresponding to the preceding digit.

35. In an automatic telephone system such as claimed in claim 32, selecting relays, a connecting mechanism having connecting wipers and contacts and control wipers and contacts, means for placing the same potential on all the control contacts of the lines in the called group excepting the last by the energization of the corresponding selecting relay.

36. In an automatic telephone system such as claimed in claim 32, an impulse receiving organ having several series of contacts, each relative to a determined series of impulses, a connecting mechanism having connecting contacts and wipers, control contacts and a control wiper, a circuit for operating the said connecting mechanism including an interrupter, controlled by a test relay, the last series of contacts of the impulse receiving organ and the control wiper, in order that the wipers of the connecting mechanism may be driven on to the last line of the called group.

37. In an automatic telephone system as claimed in claim 32, an impulse receiving organ having several series of contacts each relative to a determined series of impulses, a connecting mechanism having connecting, test and control contacts and wipers a test, relay in the circuit of the test wipers; means for connecting the calling line to the called line, for opening the battery feed circuits of the calling and called lines and for releasing the impulse receiving organ by the energization of the said test relay.

38. In an automatic telephone system as claimed in claim 32, a test circuit for the last line in the called group, an interrupter included in the said circuit, means for closing the said interrupter when the wipers of the connecting mechanism are on the last line of the called group in order to give the busy signal to the calling line if the said last line is engaged.

39. In an automatic telephone system such as claimed in claim 32, a connecting mechanism having a connecting and control contacts and wipers, a test circuit for the last line in a called group, an interrupter included in the said circuit, a relay operating the said interrupter, arranged to be "short-circuited" by the control wiper until the wipers of the connecting mechanism are driven on to the last line of the called group.

In testimony whereof I have signed my name to this specification.

ANTOINE BARNAY.